US008099053B2

(12) United States Patent
Nakano et al.

(10) Patent No.: US 8,099,053 B2
(45) Date of Patent: Jan. 17, 2012

(54) COMMUNICATION APPARATUS AND COMMUNICATION SYSTEM

(75) Inventors: Masahiro Nakano, Tokyo (JP); Kazuhiro Sato, Tokyo (JP); Mitsuhiro Suzuki, Chiba (JP); Taketoshi Shimizu, Kanagawa (JP)

(73) Assignee: Sony Corporation, Tokyo (JP)

( * ) Notice: Subject to any disclaimer, the term of this patent is extended or adjusted under 35 U.S.C. 154(b) by 490 days.

(21) Appl. No.: 12/441,721

(22) PCT Filed: Sep. 21, 2007
(Under 37 CFR 1.47)

(86) PCT No.: PCT/JP2007/069124
§ 371 (c)(1),
(2), (4) Date: Mar. 18, 2009

(87) PCT Pub. No.: WO2008/044510
PCT Pub. Date: Apr. 17, 2008

(65) Prior Publication Data

US 2010/0035559 A1 Feb. 11, 2010

(30) Foreign Application Priority Data

Sep. 25, 2006 (JP) ................................. 2006-258609

(51) Int. Cl.
*H04B 1/00* (2006.01)

(52) U.S. Cl. ......................................... 455/63.1; 455/69

(58) Field of Classification Search ......................... None
See application file for complete search history.

(56) References Cited

U.S. PATENT DOCUMENTS

| | | | |
|---|---|---|---|
| 5,857,143 A * | 1/1999 | Kataoka | 455/62 |
| 2002/0039888 A1 | 4/2002 | Hama | |
| 2005/0153702 A1 | 7/2005 | Cuffaro et al. | |
| 2007/0189242 A1 * | 8/2007 | Hosokawa et al. | 370/338 |

FOREIGN PATENT DOCUMENTS

| | | |
|---|---|---|
| EP | 1 253 753 A2 | 10/2002 |
| JP | 9 64827 | 3/1997 |
| JP | 11 177531 | 7/1999 |
| JP | 11 205251 | 7/1999 |
| JP | 2001-156876 | 6/2001 |
| JP | 2002 111603 | 4/2002 |
| JP | 2002 319946 | 10/2002 |
| JP | 2002 323222 | 11/2002 |
| WO | 2005 069800 | 8/2005 |

* cited by examiner

*Primary Examiner* — Cassandra Cox

(74) *Attorney, Agent, or Firm* — Oblon, Spivak, McClelland, Maier & Neustadt, L.L.P.

(57) ABSTRACT

Remote control data is securely transmitted to a device under control. A remote control device transmits an acknowledge request for A ch to the device under control (S21). When the device under control has assigned A ch as the reception channel, acknowledge ACK is received. A ch is assigned as the transmission channel (S23), and a command frame is transmitted through A ch (S24). When acknowledge ACK has not been received, an acknowledge request for B ch is transmitted to the device under control (S25). When the device under control has assigned B ch as the reception channel, acknowledge ACK is received. B ch is assigned as the transmission channel (S27), and a command frame is transmitted through B ch (S28). The remote control device can transmits a command through a channel through which the device under control can receive the command, so that secure remote control can be accomplished.

19 Claims, 8 Drawing Sheets

COMMUNICATION APPARATUS AND COMMUNICATION SYSTEM

TECHNICAL FIELD

The present invention relates to a communication apparatus and a communication system that are applied to remote control of an electronic device, for example, by a wireless communication system.

BACKGROUND ART

When a home electronic device is remotely controlled by a wireless communication system using a 2.4 GHz ISM (Industrial, Scientific and Medical use) band, the influence of obstructions becomes smaller and the coverage range becomes larger than by an infrared communication system. In addition to such a wireless communication system, this band has been also assigned to microwave heating. Thus, there is a problem that unnecessary radio waves (hereinafter referred to as interference waves) radiated from a microwave oven that performs microwave heating adversely interfere with the home wireless communication system. In the microwave oven, a magnetron generates microwaves of a 2.4 GHz to 2.5 GHz frequency band. In addition, there are two magnetron driving types, a transformer type and an inverter type.

In the transformer type, a commercial power supply voltage of, for example, 50 Hz is raised by a transformer and the raised voltage is applied to the magnetron. Thus, in one period T (20 ms) of a sine wave shown in FIG. 1A of the commercial power supply voltage, a non-operative region of a negative half period T1 (10 ms) occurs as shown in FIG. 1B. For example, in a real microwave oven product, the oscillation frequency of the magnetron is 2.45 GHz and electromagnetic waves periodically occur five times in an operative region (positive half period). In the inverter type, after a power supply voltage is full-wave rectified, the rectified voltage is switched by a switching device, the resultant voltage is raised by a transformer, and then applied to the magnetron. Thus, in the inverter type, until the commercial power supply voltage has been raised up to an operation start voltage of the magnetron, microwaves do not occur and a non-operative region T2 (1 to 2 ms) occurs as shown in FIG. 1C. In these non-operative regions T1 and T2, since microwaves do not occur, no interference with wireless communication occurs.

A technique of compressing information data and transmitting the compressed information data in the foregoing non-operative region T1 or T2 taking into account of the fact that a microwave oven generates interference waves in synchronization with the period of a commercial power supply is described in patent document, "Japanese Patent Application Laid-Open No. HEI 11-112441".

In addition, patent document, "Japanese Patent Application Laid-Open No. 2002-111603" describes a technology of which when a non-operative region has not been detected from a commercial power supply and an interference wave detecting section has detected a good environment in which there is no influence of interference waves, the frequency is hopped to another frequency and that when electromagnetic waves that a microwave oven had generated have been received as interference waves, the frequency of a control signal that serves to secure a communication connection state is changed to another frequency that the interference waves do not influence.

In the foregoing methods of the related art, since a frequency distribution of interference waves is not considered, the influence of interference waves is not sufficiently excluded. When the influence of interference waves to the transmission side is different from that to the reception side, their influences are not sufficiently reduced. For example, in a house, besides a microwave oven, there is another interference source such as a wireless LAN.

DISCLOSURE OF THE INVENTION

Thus, an object of the present invention is to provide a communication apparatus and a communication system that are capable of securely suppressing the influence of an interference source even if the influence of the interference source to the transmission side is different from that to the reception side.

To solve the foregoing problem, the present invention is a communication apparatus which is connected to an electronic device operating with a commercial power supply and which bidirectionally wirelessly communicates with another communication apparatus, the communication apparatus including receiving means for receiving data, period detecting means for detecting a period of the commercial power supply, and transmitting means for transmitting both a timing signal which represents the period of the commercial power supply detected by the period detecting means and acknowledge.

The present invention is a communication apparatus which bidirectionally wirelessly communicates with another communication apparatus connected to an electronic device which operates with a commercial power supply, the communication apparatus including detecting means for detecting an influence of interference waves, receiving means for receiving acknowledge from the other communication apparatus, and transmitting means for transmitting data and a request such that the receiving means receives acknowledge for the transmitted data at timing of which the influence of interference waves is low based on a timing signal which represents a period of the commercial power supply and a detection signal of the detecting means. The timing signal which represents a period of the commercial power supply is received from the other communication apparatus or obtained by the detecting means for detecting a period of the commercial power supply.

The present invention is a communication system composed of a first communication apparatus connected to an electronic device which operates with a commercial power supply and a second communication apparatus which bidirectionally wirelessly communicates with the first communication apparatus, wherein the first communication apparatus includes receiving means for receiving data from the second communication apparatus, period detecting means for detecting a period of the commercial power supply, and first transmitting means for transmitting a timing signal which represents a period of the commercial power supply detected by the period detecting means and acknowledge for the data which have been received, and wherein the second communication apparatus includes detecting means for detecting an influence of interference waves, receiving means for receiving the timing signal which represents the period of the commercial power supply and the acknowledge from the first communication apparatus, and second transmitting means for transmitting data and a request such that the receiving means receives the acknowledge for the transmitted data at timing of which the influence of interference waves is low based on the timing signal and a detection signal of the detecting means.

The first communication apparatus may transmit a beacon signal at the detected period of the commercial power supply.

The present invention is a communication system composed of a first communication apparatus connected to an electronic device which operates with a commercial power supply and a second communication apparatus which bidirectionally wirelessly communicates with the first communication apparatus, the first communication apparatus and the second communication apparatus communicating with each other through one of a plurality of channels whose frequencies are different, wherein the first communication apparatus includes receiving means for receiving data from the second communication apparatus, detecting means for detecting an influence of interference waves, and transmitting means for transmitting acknowledge for the data which have been received, and wherein the second communication apparatus includes transmitting means for transmitting a channel acknowledge request to the first communication apparatus through a channel which has been assigned, and channel assigning means for assigning a channel which interference waves do not largely influence detected by the detecting means such that the second transmitting means transmits data through the channel which has been assigned by determining whether or not acknowledge has been received through the channel which has been assigned.

The present invention is a communication system composed of a first communication apparatus connected to an electronic device which operates with a commercial power supply and a second communication apparatus which bidirectionally wirelessly communicates with the first communication apparatus, the first communication apparatus and the second communication apparatus communicating with each other through one of a plurality of channels whose frequencies are different, wherein the first communication apparatus includes receiving means for receiving data from the second communication apparatus, first detecting means for detecting an influence of interference waves, and transmitting means for transmitting acknowledge for the data which have been received, and wherein the second communication apparatus includes second detecting means for detecting an influence of interference waves, transmitting means for transmitting data to the first communication apparatus through a channel which interference waves do not largely influence detected by the first detecting means, and receiving means for receiving the acknowledge from the second communication apparatus through the channel which interference waves do not largely influence detected by the second detecting means.

According to the present invention, timing of the period of the commercial power supply supplied to an electronic device on the device under control side is transmitted, for example, to a remote controlling communication apparatus. In addition, the remote controlling communication apparatus detects the influence of interference waves and transmits data on the basis of both the received timing and the detected influence of interference waves, data can be securely transmitted and received regardless of the type of the electronic device, the manufacture thereof, and so forth. In addition, since the influence of interference waves is checked for communication channels and a communication channel is assigned on the basis of the checked result, data can be securely transmitted and received through the assigned communication channel. Further, when a channel through which data are transmitted and a channel through which acknowledge is received are differently assigned, even if the influence of interference waves to the remote controlling device is different from that to the electronic device, data can be securely transmitted and received therebetween. The present invention can be applied to a remote control system.

BEST MODES FOR CARRYING OUT THE INVENTION

Next, with reference to the accompanying drawings, an embodiment of the present invention will be described. This embodiment is applied to remotely control house electronic device. A communication apparatus (commander) that transmits remote control data (hereinafter referred to as commands) according to user's operations is referred to as the remote control device. A communication apparatus that receives transmitted commands and an electronic device that operates according to the received commands are generally referred to as the device under control.

Examples of the electronic device include AV devices such as a video recording/reproducing device, an audio recording/reproducing device, and a television receiver and home electric appliances such as a refrigerator. The remote control device is driven by a built-in power supply. The device under control is driven by a commercial power supply. The device under control has a detecting section that detects period information of the commercial power supply.

The remote control device and the device under control each have a transmitter and a receiver (that will be described later) such that they can wirelessly communicate with each other. As an exemplary wireless communication system, the physical layer of the IEEE (Institute of Electrical and Electronics Engineers) 802.15.4 standard can be used. The IEEE 802.15.4 standard is a short distance wireless network standard referred to as PAN (Personal Area Network) or W (Wireless) PAN. In this standard, the communication rate is in the range from several 10 kbps to several 100 kbps. In this standard, the communication coverage distance is in the range from several 10 meters to several 100 meters. In this invention, instead of the wireless system, another bidirectional wireless communication standard may be used. However, it is preferred to provide a function of detecting the influence of interference waves to radio channels used for communication.

Figures 1A, 1B, 1C:
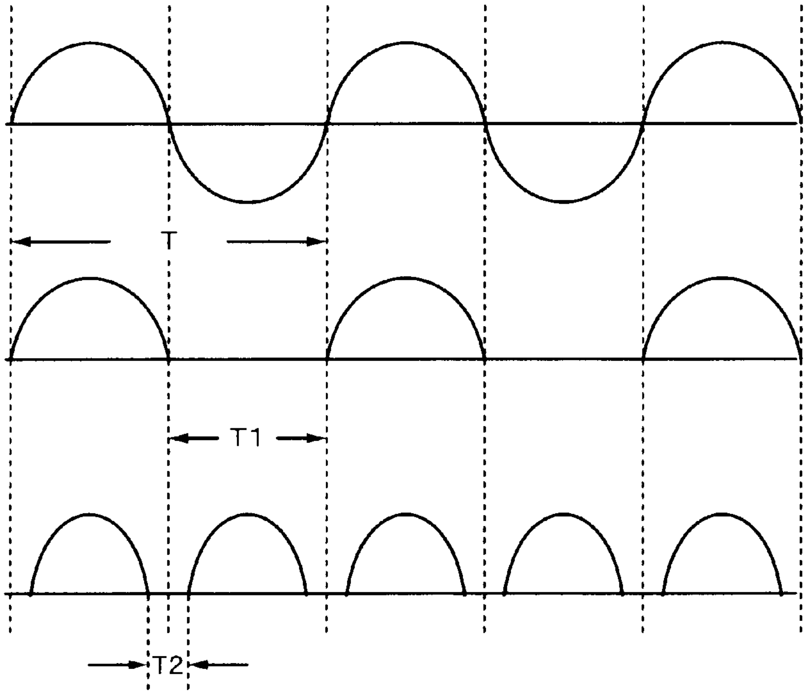
FIG. 1A, FIG. 1B and FIG. 1C are waveform diagrams describing an operative region and a non-operative region of a microwave oven as an interference source.
Figure 2:
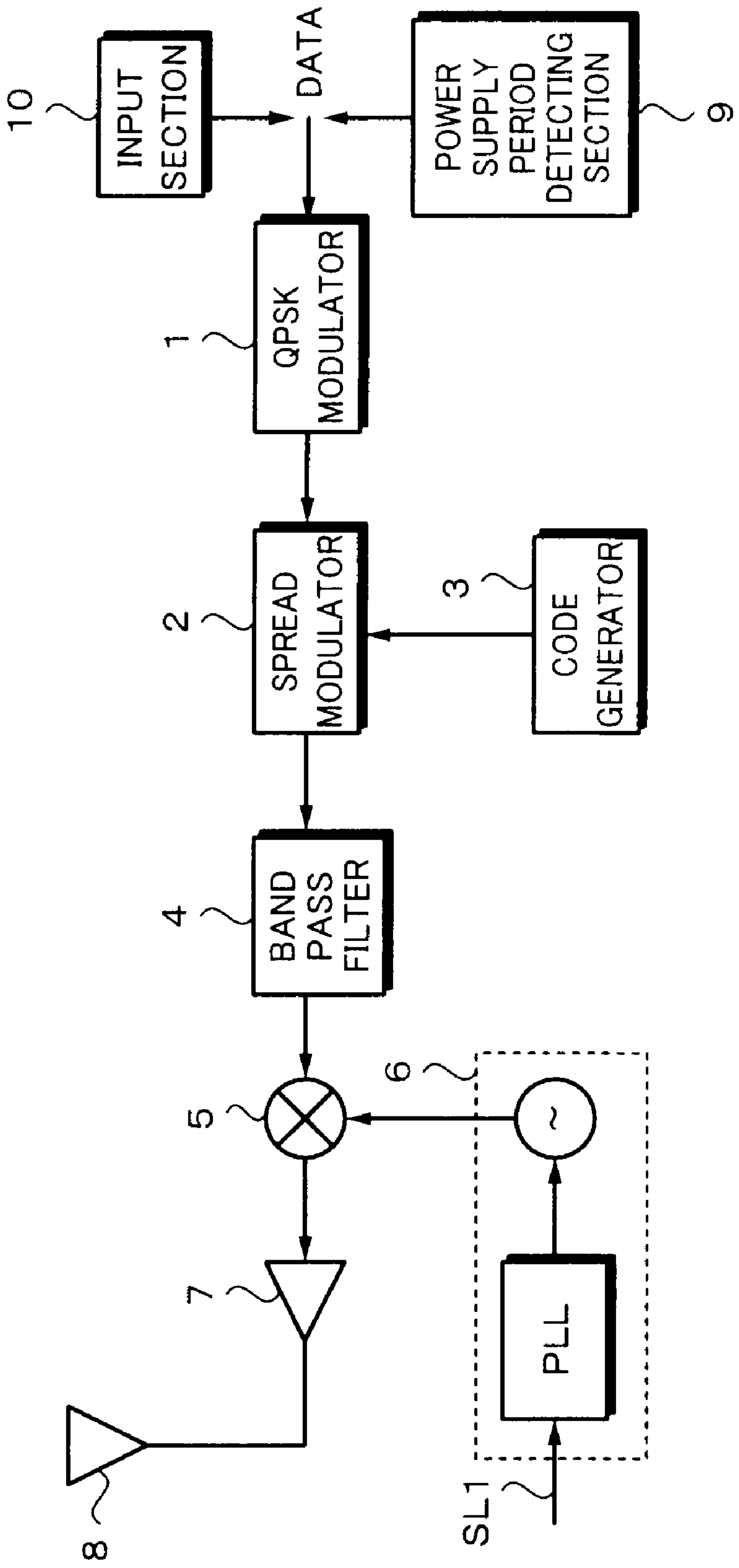
FIG. 2 is a block diagram showing the structure of a transmission side of a communication apparatus according to the present invention.

FIG. 2 shows the structure of a transmitter. Transmission data are supplied to a QPSK (Quadrature Phase Shift Keying) modulator 1 and modulated according to the QPSK modulation method. An output signal of the QPSK modulator 1 is supplied to a spread modulator 2. A spread code generated by a code generator 3 is supplied to the spread modulator 2 and spread according to the DSSS (Direct Sequence Spread Spectrum) method. As an exemplary spread code, a pseudo noise sequence is used. The DS (Direct Spread) method is an SS (Spread Spectrum) method in which a signal is phase-modulated with a high speed spread code and the spectrum of the signal is spread.

An output signal of the spread modulator 2 is supplied to a multiplier 5 through a band pass filter 4. A local oscillation signal is supplied from a PLL local oscillator 6 to the multiplier 5. The multiplier 5 generates a transmission signal that has been up-converted into a 2.4 GHz frequency band. The transmission signal is supplied to an antenna 8 through an amplifier 7 and then transmitted from the antenna 8.

As communication channels, 16 channels of 2.405 GHz, 2.410 GHz, 2.415 GHz, . . . , and 2.480 GHz at intervals of 5 MHz have been assigned. In an embodiment, a plurality of channels, for example, three channels, that are unlikely to overlap with frequencies that are likely to be used in the wireless LAN are used from these 16 channels. Channels are assigned in such a manner that a local oscillation frequency that is output from the local oscillator 6 is selected according to a channel selection signal SL1.

The device under control has a power supply period detecting section 9 and transmits a detected signal that represents timing of the period of the commercial power supply to the remote control device. The remote control device has an input section, for example, keys, switches, buttons, a touch panel, and so forth. The remote control device transmits a command corresponding to an operation of the input section to the device under control. When the device under control has correctly received the command, the device under control transmits acknowledge ACK as a response signal to the remote control device.

Figure 3:
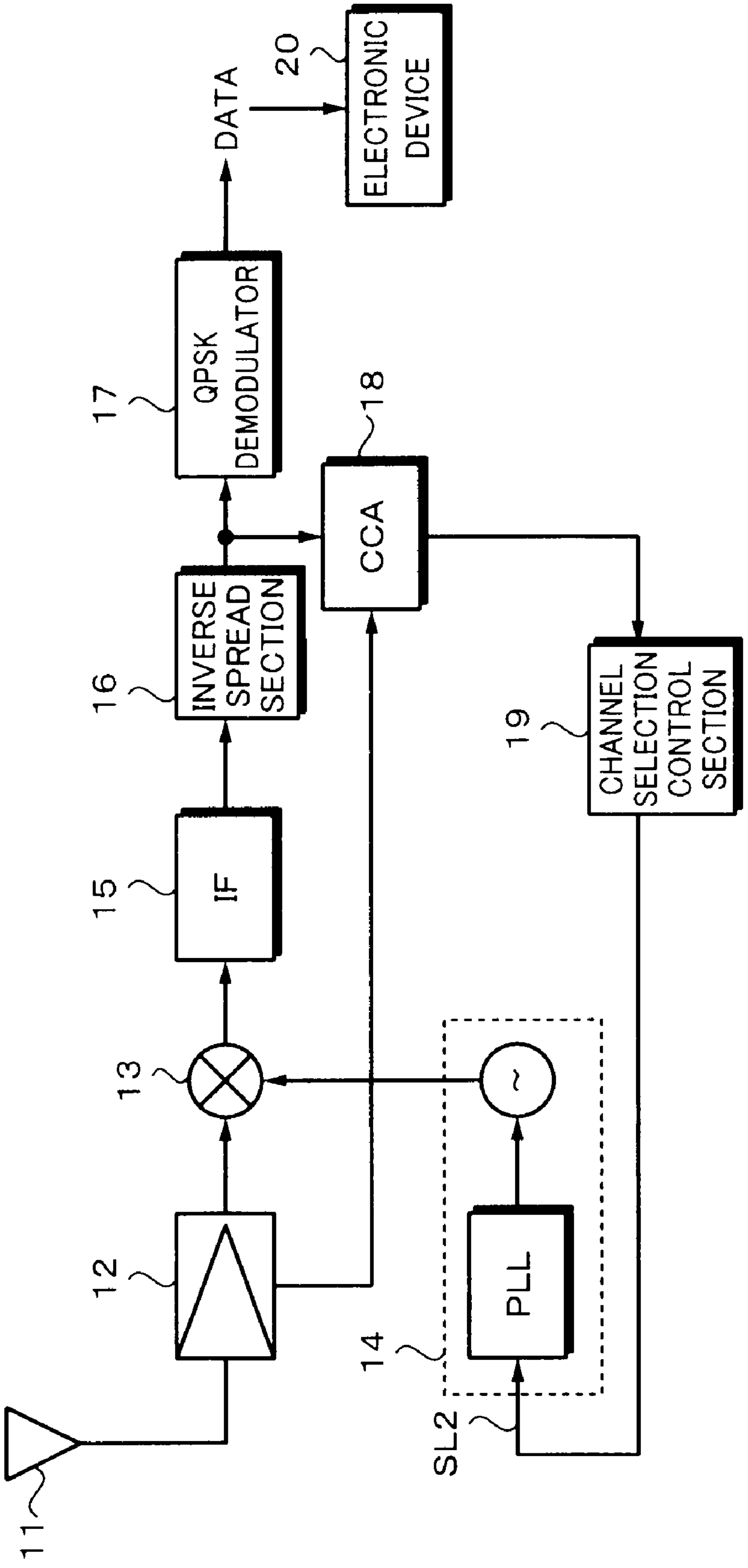
FIG. 3 is a block diagram showing the structure of a reception side of the communication apparatus according to the present invention.

FIG. 3 shows the structure of the receiver. A signal received from an antenna 11 is supplied to an LNA (Low Noise Amplifier) 12. The antenna 11 is generally shared by the antenna 8 of the transmitter, and the receiver or the transmitter is selected by a transmitter/receiver selection switch. An output signal of the LNA 12 is supplied to a multiplier 13. A local oscillation signal is supplied from a PLL local oscillator 14 to the multiplier 13. The multiplier 13 generates a down-converted IF (Intermediate Frequency) signal.

The IF signal is supplied to an inverse spread section (spread demodulating section) 16 through an intermediate frequency amplifier 15. The inverse spread section 16 demodulates the IF signal by correlating the reception signal with a reference spread code that has occurred on the reception side. Unless timing of the reception signal matches timing of the reference spread code, a correct correlation value cannot be obtained. When starting communication, the reception side detects timing and stores the detected timing. To detect timing, a correlating device such as a matched filter is used.

A demodulation signal of the inverse spread section 16 is supplied to a QPSK demodulator 17 and demodulated according to the QPSK demodulation method. Reception data can be obtained from The QPSK demodulator 17. In case of the device under control, the reception data are commands that are used to control an electronic device 20. In case of the remote control device, the reception data are acknowledge ACK that is supplied to a communication control section (not shown).

The demodulation signal of the inverse spread section 16 and the output signal of the LNA 12 are supplied to a CCA (Clear Channel Assessment) section 18. The CCA section 18 determines whether or not an interference power from another system is large based on the received power and the quality of the demodulation signal. In other words, the CCA section 18 determines whether or not interference waves largely influence a channel that is being used. When the determined result denotes that interference waves largely influence the channel that is being used, the CCA section 18 measures interference powers of other channels and determines a channel that interference waves do not largely influence. The IEEE 802.15.4 standard defines functions of CCA and ED (Energy Detection).

The determined result of the CCA section 18 is supplied to a channel selection control section 19. The channel selection control section 19 generates a channel selection signal SL2 based on the determined result. The channel selection signal SL2 controls the local oscillator 14 to select a channel that interference waves do not largely influence. The CCA section 18 of the device under control regularly detects the influence of interference waves. In addition, since the remote control device operates with the built-in power supply, if the CCA section 18 regularly operates, the power consumption of the built-in power supply becomes large. Thus, when necessary, for example, when the remote control device transmits a command to the device under control, the remote control device operates the CCA section 18.

Each of the transmitter and the receiver has a control section (microcomputer) (not shown) for controlling the transmitter or the receiver to perform the transmission or reception operation. The channel selection control section 19 can be accomplished as a function of the control section.

Figure 4A:
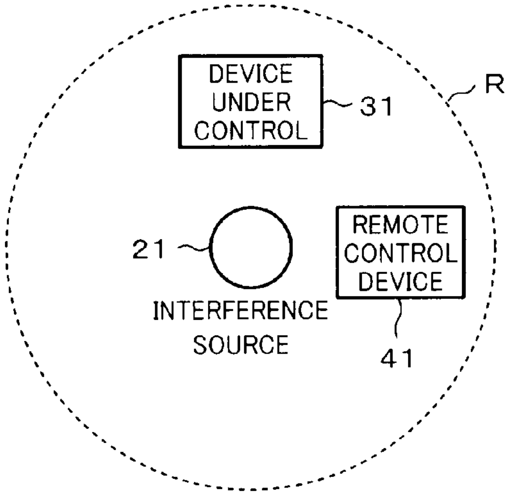
FIG. 4A and FIG. 4B are schematic diagrams describing the influences of interference sources.

With reference to FIG. 4A, FIG. 4B, FIG. 5A and FIG. 5B, the influences of interference sources such as a microwave oven and a wireless network to frequencies will be described. FIG. 4A shows the case that both a device under control 31 and a remote control device 41 exist in an influence range R of interference waves of one interference source (for example, a microwave oven) 21. In this case, both the device under control 31 and the remote control device 41 are equally influenced by the interference source 21.

Figure 4B:
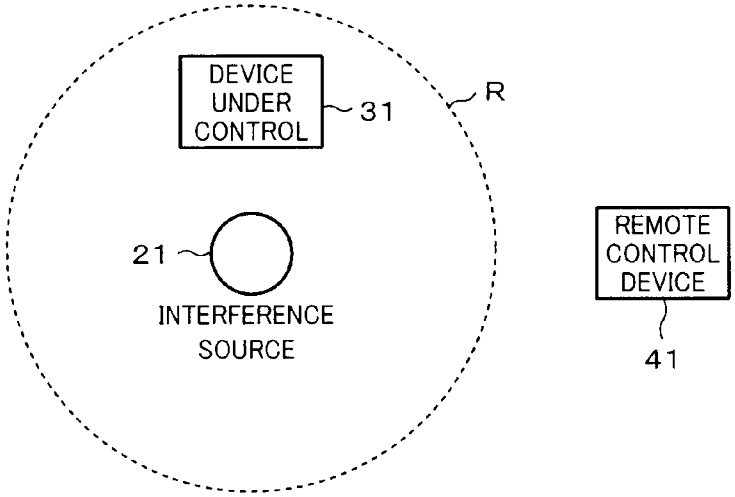

FIG. 4B shows the case that only the device under control 31 exists in the influence range R of the interference source 21 and that the remote control device 41 is outside the influence range R. In this case, only the device under control 31 is influenced by the interference source 21. When the device under control 31 has a detecting section that detects the influence of interference waves, the device under control 31 assigns a channel that interference waves do not largely influence and the remote control device 41 transmits a command to the device under control 31 through the assigned channel. The influence of interference waves to data that are received is larger than that to data that are transmitted. Thus, when a command is transmitted through the assigned channel, the device under control 31 can receive the command. In addition, the remote control device 41 can receive acknowledge ACK that the device under control 31 has transmitted through the assigned channel.

Figure 5A:
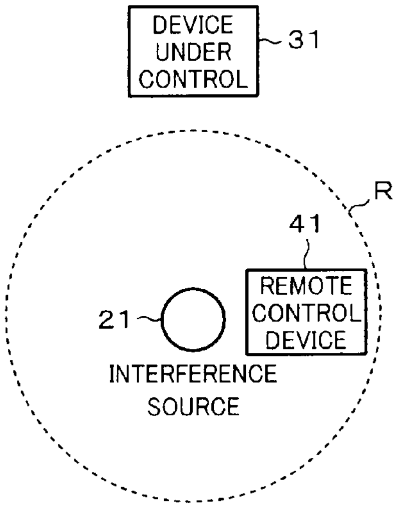
FIG. 5A and FIG. 5B are schematic diagrams describing the influences of interference sources.

FIG. 5A shows the case that only the remote control device 41 exists in the influence range R of the interference source 21 and that the device under control 31 is outside the influence range R. In this case, only the remote control device 41 is influenced by the interference source 21. In this case, although the device under control 31 can receive a command and the remote control device 41 can transmit a command through a channel that the device under control 31 has assigned, the remote control device 41 is unable to receive acknowledge ACK that the device under control 31 has transmitted.

Figure 5B:
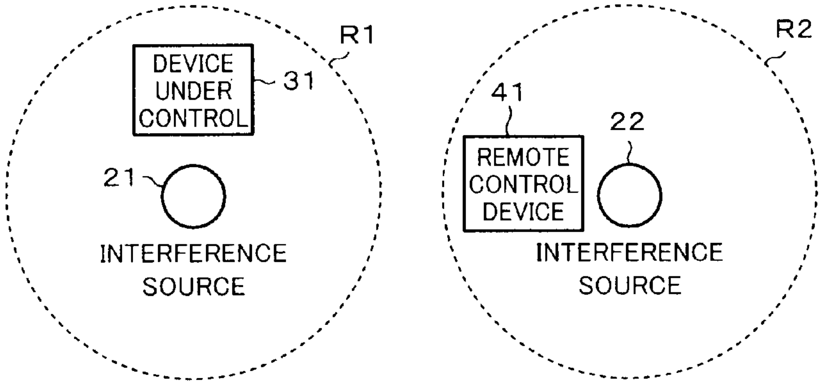

Further, FIG. 5B shows the case that two interference sources 21 and 22 exist, their influence ranges are R1 and R2, respectively, the device under control 31 exists in the influence range R1, and the remote control device 41 exists in the influence range R2. In this case, the device under control 31 and the remote control device 41 are influenced by the different interference sources. In this case, like the case shown in FIG. 5A, although the remote control device 41 can transmit a command and the device under control 31 can receive a command, the remote control device 41 is unable to receive acknowledge ACK. Thus, in the cases shown in FIG. 5A and FIG. 5B, a problem occurs that even if the device under control 31 assigns a channel that interference waves do not largely influence, communication is not properly performed.

Figure 6:
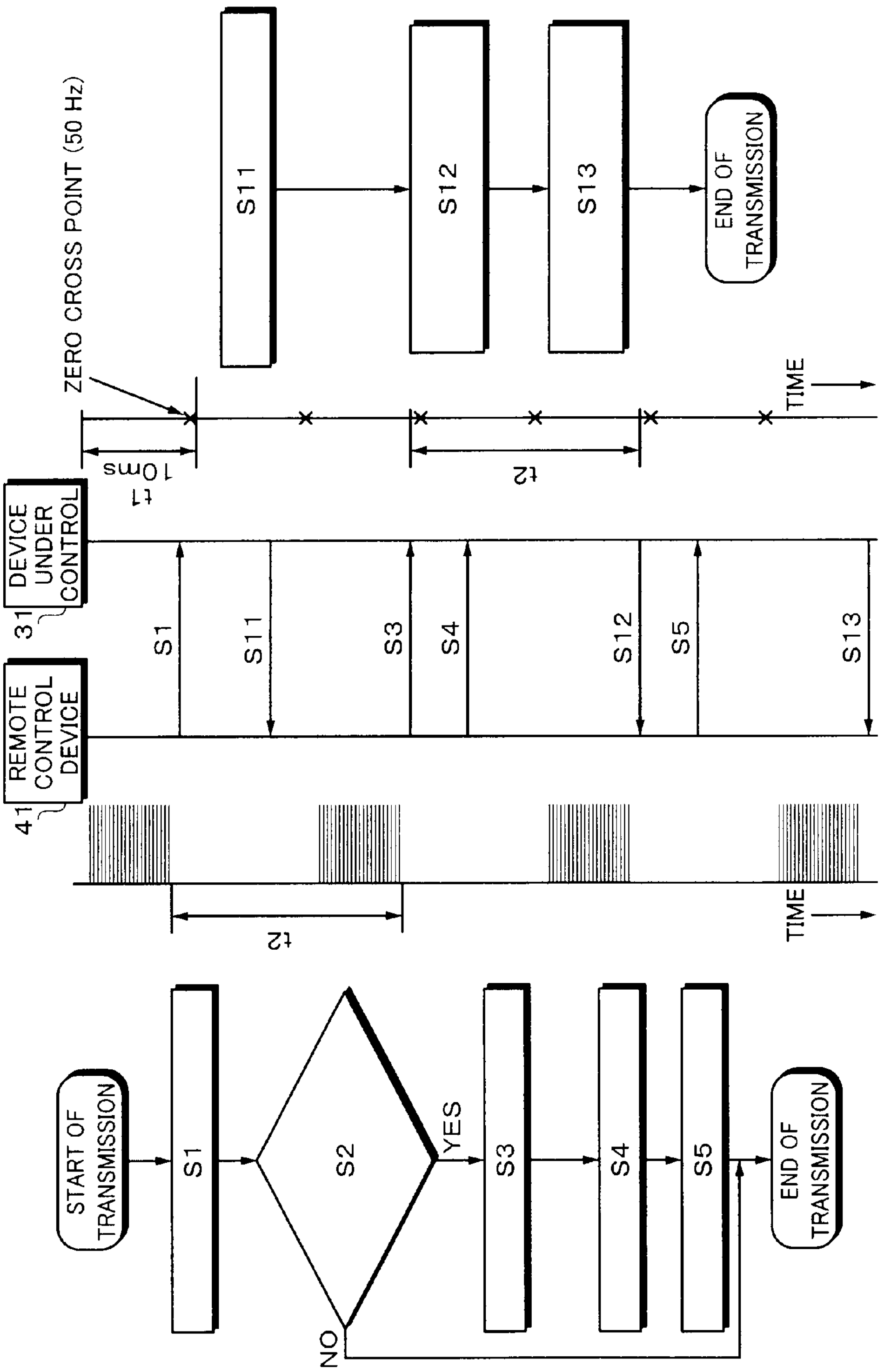
FIG. 6 is a flow chart showing a communication process according to an embodiment of the present invention.

With reference to FIG. 6, an embodiment will be described. The device under control 31 detects timing of the period of the commercial power supply, for example, a zero cross point of a sine wave of the power supply. When a 50 Hz commercial power supply is used, the device under control 31 detects the zero cross point at period t1 of 10 ms. The detection process is constantly performed. The period of the detected zero cross point is referred to as the period information. When the device under control operates in synchronization with the commercial power supply, the period information corresponds to the occurrence period of interference waves.

In an embodiment, both the device under control 31 and the remote control device 41 have the function (CCA) of detecting the influence of interference waves. In the remote control device 41, period t2 of interference waves at the position where the remote control device 41 is provided is measured by the function of CCA. Period t2 is a period at which interference waves do not occur. When the remote control device 41 starts transmitting a predetermined command, at step S1, a transmission request for the period information is transmitted to the device under control 31. The device under control 31 which has received the transmission request transmits the period information (at step S11).

At step S2, the remote control device 41 which has received the period information determines whether period t2 of interference waves matches an integer multiple (for example, twice) of period t1 of the zero cross point of the commercial power supply. When their differences are in a predetermined tolerance range, the remote control device 41 determines that they match.

When the determined result at step S2 denotes that they match, the remote control device 41 requests the device under control 31 to transmit acknowledge ACK at period t2 (at step S3). At step S4, a command frame is transmitted. After t2 has elapsed, at step S5, the remaining command frame is transmitted.

When the device under control 31 has correctly received the command frame from the remote control device 41, the device under control 31 transmits acknowledge ACK to the remote control device 41. In other words, at step S12, the device under control 31 transmits acknowledge ACK to the remote control device 41 in response to the command frame transmitted at step S4 after t2 has elapsed. At step S13, the device under control 31 transmits acknowledge ACK to the remote control device 41 in response to the command frame transmitted at step S5 after t2 has elapsed. After the remote control device 41 has received acknowledge ACK, the remote control device 41 completes the transmission.

The number of command frames that the remote control device 41 transmits is not limited to 2. Instead, the number of command frames that the remote control device 41 transmits may be 1 or 3 or more. Whenever the remote control device 41 transmits a sequence of command frames corresponding to operations performed, for example, in several seconds, the foregoing process of preventing the influence of interference waves is performed.

When the determined result at step S2 denotes that the period of interference waves is not an integer multiple of t1, the remote control device 41 completes the process without transmitting a command frame. In this case, with sound, light, indication, or the like, the remote control device 41 warns the user that the remote control device 41 has failed to transmit a command frame. When the remote control device 41 has failed to transmit a command frame, the remote control device 41 may retransmit the command frame instead of completing the transmission of the command frame.

Instead, the remote control device 41 and the device under control 31 may communicate with each other only in the period of which interference waves do not occur on the basis of both the detected result of the device under control for the period in which interference waves do not occur at timing in synchronization with the commercial power supply and the detected result of the remote control device for the period in which the influence of interference waves is not large.

In the foregoing embodiment, since communication is performed using not only period information of the commercial power supply detected by the device under control side, but information about the influence of interference waves detected by the remote control device, the remote control device and the device under control can properly communicate with each other. Thus, the remote control device can securely remote-control the device under control. In other words, since the remote control device is isolated from the commercial power supply, the period information of the commercial power supply cannot be detected. In contrast, although the device under control side can detect interference waves of the wireless system, the device under control can more easily and securely detect interference waves of the commercial power supply than those of the wireless system. Thus, in an embodiment, to improve the reliability, the remote control device and the device under control transmit and receive a command and acknowledge, respectively, in a region that interference waves do not influence they have determined. In addition, at the remote control device side, detection of interference waves causes consumption of the power supply. However, remote control data are transmitted and received in a short period and so are interference waves (8 ms or less for example from an microwave oven). Thus, the power consumption in the case of an embodiment is not larger than that in the case that since detection of interference waves is not performed, a command is failed to be transmitted and received and it is re-transmitted and re-received.

Figure 7:
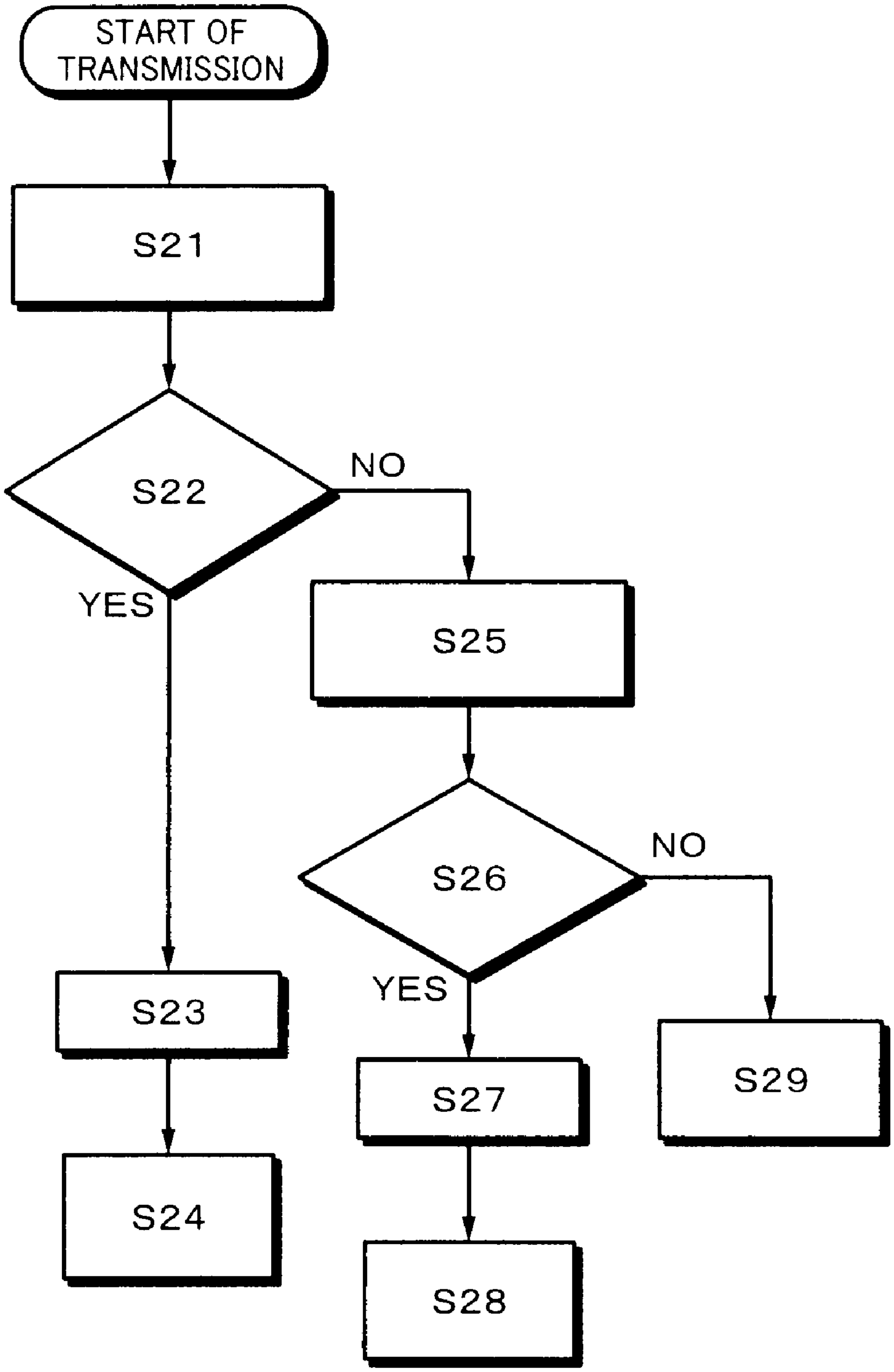
FIG. 7 is a flow chart showing a communication process according to another embodiment of the present invention.

Next, with reference to FIG. 7, another embodiment of the present invention in which a communication channel (frequency) that interference waves do not largely influences is assigned will be described. FIG. 7 shows a channel assignment process of the remote control device. The CCA of the device under control is controlled to detect a channel that interference waves do not largely influence constantly or at intervals of a predetermined period. Thus, a command is received through the detected good channel.

At step S21, the remote control device transmits an acknowledge request for A ch (channel) to the device under control. At step S22, the remote control device determines whether or not it has received acknowledge ACK from the device under control through A ch. For the determination process, a predetermined period is assigned.

When the remote control device has received acknowledge ACK in the predetermined period, the remote control device determines that A ch is a channel that can be currently used. At step S23, A ch is assigned, and at step S24, a command frame is transmitted through A ch. At step S22, when the remote control device has determined that it has not received acknowledge ACK from the device under control in the predetermined period, at step S25, the remote control device transmits an acknowledge request for another channel, B ch (channel) to the device under control.

At step S26, the remote control device determines whether or not it has received acknowledge ACK from the device under control through B ch in the predetermined period. When the remote control device has received acknowledge ACK in the predetermined period, the remote control device determines that B ch is a channel that can be currently used. At step S27, B ch is assigned, and at step S28, a command frame is transmitted through B ch. At step S26, when the remote control device has determined that it has not received acknowledge ACK in the predetermined period, at step S29, a termination process is performed. The termination process is a process of repeating the channel assignment process, a process of warning the user that there is no good communication channel, or the like. When there are three or more channels that the remote control device can select and the determined result at step S26 denotes that the remote control device has not received acknowledge ACK, the remote control device performs the same process for another channel. Whenever the remote control device has transmitted a sequence of command frames corresponding to operations performed, for example, in several seconds, the remote control device performs the process of preventing the influence of interference waves against a communication channel.

The foregoing method of assigning a communication channel is accomplished in combinations with the foregoing method of preventing the influence of interference waves on the time base of the foregoing embodiment. In other words, after a communication channel is assigned according to the foregoing method, a command frame is transmitted according to the method of the foregoing embodiment. However, as shown in FIG. 5A or FIG. 5B, when the remote control device has detected that interference waves do not largely influence a particular channel, the device under control 31 may not have detected so. In this case, the foregoing channel assignment method is insufficient.

Figure 8:
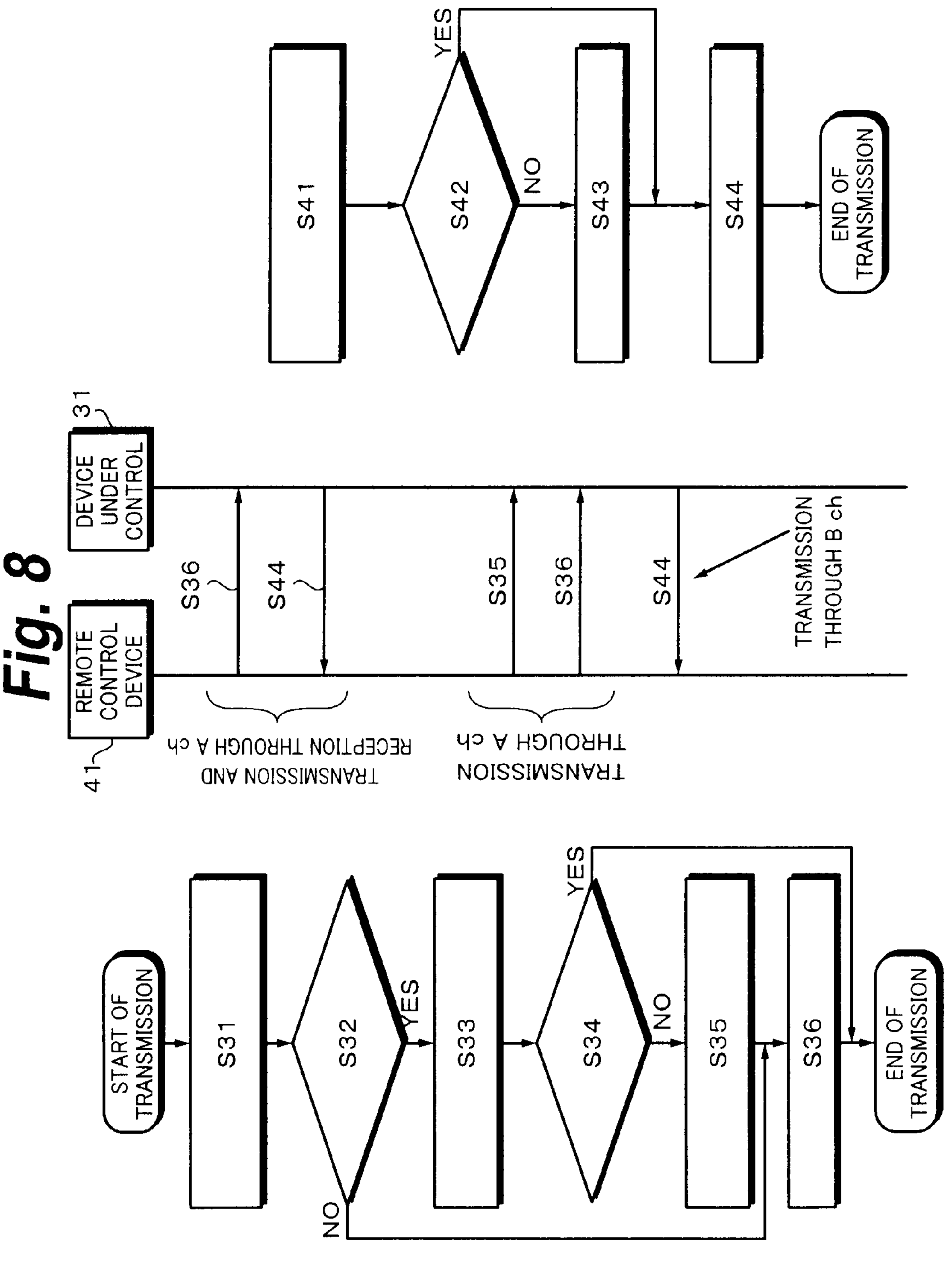
FIG. 8 is a flow chart showing a communication process according to another embodiment of the present invention.

With reference to FIG. 8, another embodiment of the present invention where such an insufficient channel assignment method has been improved will be described. First, transmission starts using A ch. A ch is assigned according to the assignment method of the foregoing embodiment. When the remote control device 41 starts transmitting a command to the device under control, at step S31, the remote control device 41 checks the reception state of A ch that is currently used. In other words, at step S32, the CCA function of the remote control device 41 determines whether or not interference waves largely influence A ch. When the determined result denotes that interference waves do not largely influence A ch, at step S36, a command frame is transmitted.

At step S41, when the device under control 31 has correctly received the command frame through A ch, at step S42, the device under control 31 determines whether or not it has received a transmission request for acknowledge ACK using A ch. When the determined result denotes that the device under control 31 has received the transmission request, at step S44, an acknowledge ACK frame is transmitted to complete transmission and reception of the command frame through A ch.

During processing of the remote control device 41, at step S32, when the remote control device 41 has determined that interference waves largely influence A ch that has been assigned the flow advances to step S33. At step S33, the remote control device 41 checks the reception state of B ch. At step S34, the CCA function of the remote control device 41 determines whether or not interference waves largely influence B ch. When the determined result at step S34 denotes that interference waves do not largely influence B ch, at step S35, the remote control device 41 transmits a request for acknowledge ACK using B ch to the device under control 31 through A ch. At step S36, a command frame is transmitted through A ch. Since the device under control 31 has assigned A ch as a channel that interference waves do not largely influence, the device under control 31 can receive the request and command frame.

At step S41, when the device under control 31 has received the command frame through A ch, at step S42, the device under control 31 determines whether the remote control device 41 has transmitted a transmission request for acknowledge ACK through A ch. Since the remote control device 41 has transmitted a command frame which request to transmit acknowledge ACK through B ch at step S35, the determined result at step S42 is No.

In this case, at step S43, the device under control 31 assigns B ch as the transmission channel while the device under control 31 has assigned A ch as the reception channel. At step S44, the device under control 31 transmits acknowledge ACK through B ch. Since the remote control device 41 can receive acknowledge ACK, transmission and reception of the command frame is completed.

In the foregoing embodiment of the present invention, whenever the remote control device has transmitted a sequence of command frames corresponding to operations performed, for example, in several seconds, the remote control device performs the process of preventing the influence of interference waves against a communication channel. In another embodiment, although both the device under control 31 and the remote control device 41 have the detecting section that detects the influence of interference waves, commands can be more securely transmitted than in the process of transmitting and receiving the detected results of the detecting sections and assigning channels according to the detected results.

The present invention is not limited to the foregoing embodiments but various kinds of modifications based on the technical ideas of the invention are possible. For example, the wireless communication method may be based on other than the IEEE 802.15.4 standard. In addition, the influence of interference waves may be determined according to a bit error rate of reception data.

Furthermore, the device under control may regularly generate a beacon signal at timing of period information, in particular, a zero cross point of a power supply signal, or a period in which no interference waves occur detected from the power supply. The remote control device has an internal real time clock, receives a beacon signal, and stores the zero cross point and timing of the period in which no interference waves occur detected from the power supply. When the remote control device has failed to transmit data due to the influence of interference waves, the remote control device generates timing to transmit a command frame based on both timing information that the remote control device has stored and the period in which no interference waves occur in the power supply. When a predetermined period has elapsed after the remote control device has transmitted a command frame, for example, the power supply of the device under control has been turned on, the remote control device receives a beacon signal and corrects the internal timing.

Hereinafter, a method of using a beacon signal in the case that interference waves largely influence only a channel that the remote control device side uses will be exemplified.

1. The remote control device transmits data even in the period in which interference waves occur detected by the remote control device. However, the device under control transmits data, namely the remote control device receives data in synchronization with the period in which no interference waves occur.

2. The remote control device transmits information that denotes that no interference waves occur and information that represents timing in which they occur. The device under control continuously transmits data when no interference waves occur taking into account of deviation between the information that the device under control has received from the remote control device and the information that the device under control has detected.

3. When interference waves influence a channel that the remote control device uses, it checks whether or not interference waves influence another channel. When there is a channel that interference waves do not influence, the remote control device requests the device under control to transmit data through the channel that interference waves do not influence.

4. The remote control device has a means that measures an elapsed period after the remote control device has transmitted a data transmission command. Until an assigned period has elapsed, the foregoing bidirectional communication means of the remote control device tries to transmit and receive data. When the communication means has failed to communicate with the device under control, the communication means transmits data that does not require acknowledge to the device under control and completes the communication with the device under control.

In the processes 1, 2, and 3, interference waves influence only the remote control device side. Of cause, interference waves may influence only the device under control. The remote control device side may have a function of detecting period information of the commercial power supply. In this case, it is not necessary to receive period information of the commercial power supply from the electronic device side. Only the remote control device can generate proper timing. To allow the remote control device side to detect the period of the commercial power supply, a photo-electrical converter such as a photo detector that detects for example light of a fluorescent lamp may be disposed in the remote control device.

DESCRIPTION OF REFERENCE NUMERALS

1 QPSK MODULATOR
6 LOCAL OSCILLATOR
10 OPERATING SECTION
9 POWER SUPPLY PERIOD DETECTING SECTION
14 LOCAL OSCILLATOR
18 CCA (Clear Channel Assessment) SECTION
19 CHANNEL SELECTION CONTROL SECTION
20 ELECTRONIC DEVICE
S1 SEND TRANSMISSION REQUEST
S2 DOES PERIOD OF INTERFERENCE WAVE MATCH INTEGER MULTIPLE OF t1?
S3 REQUEST TRANSMISSION AT t2
S4 TRANSMIT COMMAND FRAME
S5 TRANSMIT COMMAND FRAME
S11 TRANSMIT PERIOD INFORMATION
S12 TRANSMIT ACK OF COMMAND FRAME AFTER ELAPSE OF t2
S13 TRANSMIT ACK OF COMMAND FRAME AFTER ELAPSE OF t2
S21 TRANSMIT ACKNOWLEDGE REQUEST FOR A ch
S22 HAS ACK BEEN RECEIVED?
S23 ASSIGN A ch
S24 TRANSMIT COMMAND FRAME
S25 TRANSMIT ACKNOWLEDGE REQUEST FOR B ch S26 HAS ACK BEEN RECEIVED?
S27 ASSIGN B ch
S28 TRANSMIT COMMAND FRAME
S29 END
S31 CHECK RECEPTION STATE OF A ch BEING USED
S32 DO INTERFERENCE WAVES INFLUENCE A ch?
S33 CHECK RECEPTION STATE OF B ch
S34 DO INTERFERENCE WAVES INFLUENCE B ch?
S35 TRANSMIT REQUEST FOR ACK USING B ch
S36 TRANSMIT COMMAND FRAME
S41 RECEIVE COMMAND FRAME THROUGH A ch
S42 IS REQUEST FOR ACK USING A ch?
S43 ASSIGN B ch AS TRANSMISSION CHANNEL
S44 TRANSMIT ACK

The invention claimed is:

1. A communication apparatus which is connected to an electronic device operating with a commercial power supply and which bidirectionally wirelessly communicates with another communication apparatus, the communication apparatus, comprising:

receiving means for receiving data;

period detecting means for detecting a period of the commercial power supply; and transmitting means for transmitting both a timing signal which represents the period of the commercial power supply detected by the period detecting means and acknowledge.

2. The communication apparatus as set forth in claim 1, wherein the receiving means receives remote control data with which the electronic device is controlled.

3. A communication apparatus which bidirectionally wirelessly communicates with another communication apparatus connected to an electronic device which operates with a commercial power supply, the communication apparatus comprising:

detecting means for detecting an influence of interference waves;

receiving means for receiving acknowledge from the other communication apparatus; and transmitting means for transmitting data and a request such that the receiving means receives acknowledge for the transmitted data at timing of which the influence of interference waves is low based on a timing signal which represents a period of the commercial power supply and a detection signal of the detecting means.

4. The communication apparatus as set forth in claim 3, wherein the receiving means receives the timing signal which represents the period of the commercial power supply from the other communication apparatus.

5. The communication apparatus as set forth in claim 3, further comprising:

a detecting device which detects the timing signal which represents the period of the commercial power supply.

6. The communication apparatus as set forth in claim 3, further comprising:

an input section, wherein the transmitting means transmits remote control data with which the electronic device is remotely controlled, the remote control data corresponding to a command which is input from the input section.

7. A communication system composed of a first communication apparatus connected to an electronic device which operates with a commercial power supply and a second communication apparatus which bidirectionally wirelessly communicates with the first communication apparatus, wherein the first communication apparatus comprises:

receiving means for receiving data from the second communication apparatus;

period detecting means for detecting a period of the commercial power supply; and transmitting means for transmitting a timing signal which represents a period of the commercial power supply detected by the period detecting means and acknowledge for the data which have been received, and wherein the second communication apparatus comprises:

detecting means for detecting an influence of interference waves;

receiving means for receiving the timing signal which represents the period of the commercial power supply and the acknowledge from the first communication apparatus; and transmitting means for transmitting data and a request such that the receiving means receives the acknowledge for the transmitted data at timing of which the influence of interference waves is low based on the timing signal and a detection signal of the detecting means.

8. The communication system as set forth in claim 7, wherein the first communication apparatus receives remote control data with which the electronic device is remotely controlled.

9. The communication system as set forth in claim 7, wherein the second communication apparatus further comprises an input section which inputs a command with which the electronic device is remotely controlled, and wherein the transmitting means transmits remote control data corresponding to the command which has been input from the input section.

10. A communication system composed of a first communication apparatus connected to an electronic device which operates with a commercial power supply and a second communication apparatus which bidirectionally wirelessly communicates with the first communication apparatus, wherein the first communication apparatus comprises:

receiving means for receiving data from the second communication apparatus;

period detecting means for detecting a period of the commercial power supply; and transmitting means for transmitting a beacon signal at timing corresponding to a period of the commercial power supply detected by the period detecting means and acknowledge for the data which have been received, and wherein the second communication apparatus comprises:

detecting means for detecting an influence of interference waves;

receiving means for receiving the beacon signal and the acknowledge from the first communication apparatus;

time information storing means for storing time information corresponding to the received beacon signal; and transmitting means for transmitting data and a request such that the receiving means receives the acknowledge for the transmitted data at timing of which the influence of interference waves is low based on the time information which has been stored and a detection signal of the detecting means.

11. The communication system as set forth in claim 10, wherein the first communication apparatus receives remote control data with which the electronic device is remotely controlled.

12. The communication system as set forth in claim 10, wherein the second communication apparatus further comprises an input section which inputs a command with which the electronic device is remotely controlled, and wherein the transmitting means transmits remote control data corresponding to the command which has been input from the input section.

13. A communication system composed of a first communication apparatus connected to an electronic device which operates with a commercial power supply and a second communication apparatus which bidirectionally wirelessly communicates with the first communication apparatus, the first communication apparatus and the second communication apparatus communicating with each other through one of a plurality of channels whose frequencies are different, wherein the first communication apparatus comprises:

receiving means for receiving data from the second communication apparatus;

detecting means for detecting an influence of interference waves; and transmitting means for transmitting acknowledge for the data which have been received, and wherein the second communication apparatus comprises:

transmitting means for transmitting a channel acknowledge request to the first communication apparatus through a channel which has been assigned; and channel assigning means for assigning a channel which interference waves do not largely influence detected by the detecting means such that the second transmitting means transmits data through the channel which has been assigned by determining whether or not acknowledge has been received through the channel which has been assigned.

14. The communication system as set forth in claim 13, wherein the first communication apparatus receives remote control data with which the electronic device is remotely controlled.

15. The communication system as set forth in claim 13, wherein the second communication apparatus further comprises an input section which inputs a command with which the electronic device is remotely controlled, and wherein the transmitting means transmits remote control data corresponding to the command which has been input from the input section.

16. A communication system composed of a first communication apparatus connected to an electronic device which operates with a commercial power supply and a second communication apparatus which bidirectionally wirelessly communicates with the first communication apparatus, the first communication apparatus and the second communication apparatus communicating with each other through one of a plurality of channels whose frequencies are different, wherein the first communication apparatus comprises:

receiving means for receiving data from the second communication apparatus;

first detecting means for detecting an influence of interference waves; and transmitting means for transmitting acknowledge for the data which have been received, and wherein the second communication apparatus comprises:

second detecting means for detecting an influence of interference waves;

transmitting means for transmitting data to the first communication apparatus through a channel which interference waves do not largely influence detected by the first detecting means; and receiving means for receiving the acknowledge from the second communication apparatus through the channel which interference waves do not largely influence detected by the second detecting means.

17. The communication system as set forth in claim 16, wherein the first communication apparatus receives remote control data with which the electronic device is remotely controlled.

18. The communication system as set forth in claim 16, wherein the second communication apparatus further comprises an input section which inputs a command with which the electronic device is remotely controlled, and wherein the transmitting means transmits remote control data corresponding to the command which has been input from the input section.

19. The communication system as set forth in claim 16, wherein when the second detecting means has detected which interference wave largely influence a channel through which the data are transmitted, the first communication apparatus requests the second communication apparatus to communicate through another channel which interference waves do not largely influence detected by the second detecting means and receives the acknowledge from the second communication apparatus through the other channel.

* * * * *